United States Patent [19]
Yamakawa

[11] Patent Number: 5,146,360
[45] Date of Patent: Sep. 8, 1992

[54] LIGHT BEAM SCANNING OPTICAL SYSTEM

[75] Inventor: Kazuo Yamakawa, Osaka, Japan

[73] Assignee: Minolta Camera Co., Ltd., Osaka, Japan

[21] Appl. No.: 738,328

[22] Filed: Jul. 31, 1991

[30] Foreign Application Priority Data

Aug. 1, 1990 [JP] Japan ................................ 2-205896

[51] Int. Cl.⁵ .............................................. G02B 26/10
[52] U.S. Cl. ..................................... 359/216; 359/217
[58] Field of Search ................................. 359/216-219

[56] References Cited

U.S. PATENT DOCUMENTS 4,919,502 4/1990 Yamakawa.
4,963,900 10/1990 Budd et al..

FOREIGN PATENT DOCUMENTS 0378149 7/1990 European Pat. Off..
62-262812 11/1987 Japan.

Primary Examiner—Craig E. Church
Attorney, Agent, or Firm—Price, Gess & Ubell

[57] ABSTRACT

A light beam scanning optical system having a linear image forming optical system for converging a laser beam from a light source into linear images on the deflection reflecting surface of deflector, and a scanning image forming optical system for causing the laser beam reflected from the deflector to form images on the object to be scanned, wherein said scanning image forming optical system including at least one toric surface and at least one compound lens composed of a positive lens and a negative lens, whereby the object is scanned correctly by the laser beam despite a difference in wavelength between the laser beams used or variations in the wavelength of the beam.

11 Claims, 9 Drawing Sheets

FIG.1
(A)
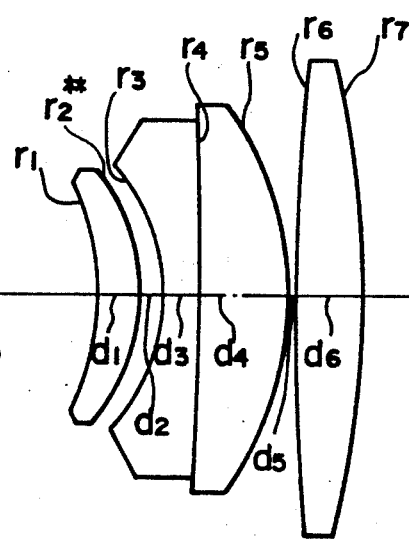
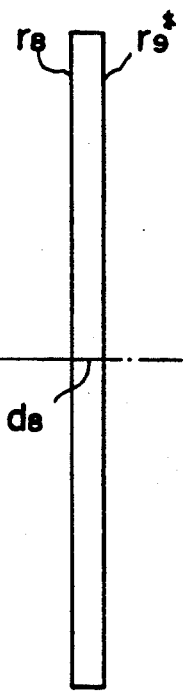
(B)
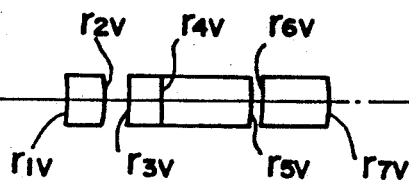

FIG.2
(A)
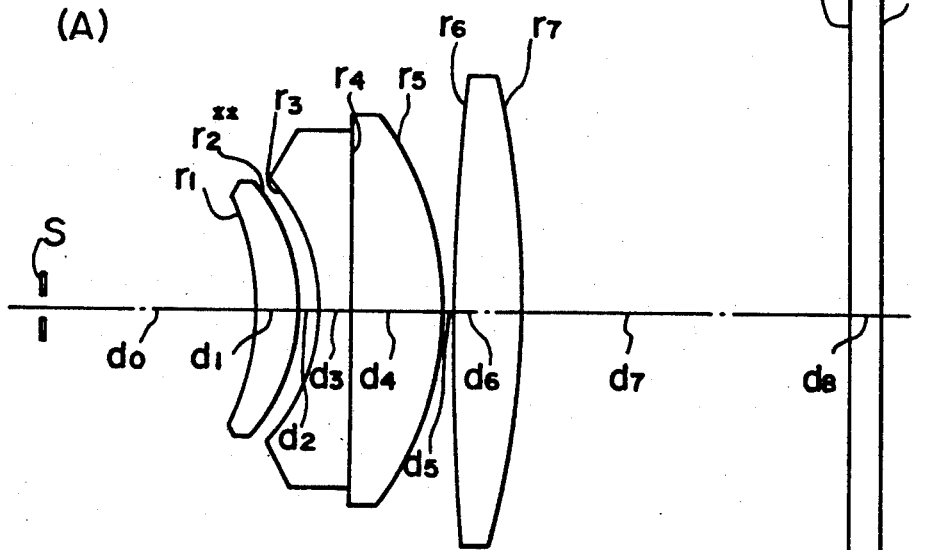
(B)
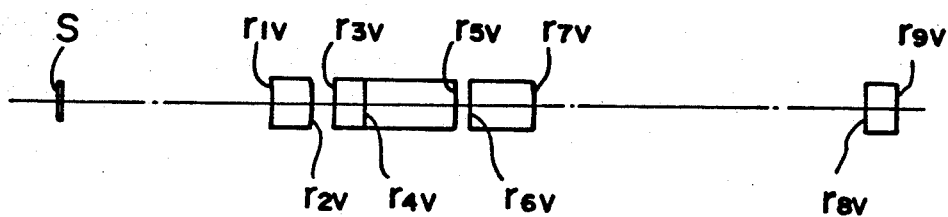

LIGHT BEAM SCANNING OPTICAL SYSTEM

BACKGROUND OF THE INVENTION

1. Field of the Invention

The present invention relates to scanning optical systems primarily for use in laser beam printers and the like, and more particularly to scanning optical systems having a tilt correcting function and adapted for use in printers including lasers of different wavelengths.

2. Description of the Related Art

In scanning optical systems for use in laser beam printers and the like, a deflecting device such as a polygonal mirror is used for deflecting the beam from a light source.

The deflection reflecting surface of the deflecting device has some tilt errors with respect to a direction orthogonal to the scanning plane which are attributable to manufacturing errors, installation errors or vibration during the rotation of the device.

When a beam is reflected from the deflection reflecting surface involving such tilt errors and projected onto the object to be scanned, images are formed thereon as deviated in the subscanning direction, consequently producing variations in the pitch of scan lines. These variations in the pitch of scan lines impair the quality of images to be recorded by recording apparatus such as laser beam printers.

Tilt correcting optical systems are adapted to eliminate the influence of tilt errors of the deflection reflecting surface to obviate this objection.

More specifically, the tilt correcting optical system has a linear image forming optical system for converging the beam from a light source in a direction orthogonal to the scanning plane first to form linear images on the deflection reflecting surface of the deflecting device, and an image forming optical system for forming a conjugate relation between the deflection reflecting surface and the surface of the object to be scanned. Accordingly, variations in the pitch of scan lines can be eliminated by using the correcting optical system.

In scanning optical systems having a polygonal mirror or like deflecting device, on the other hand, the speed of scanning of the object with a beam in the scanning plane is made constant.

Stated more specifically, the optical system is so designed that the angle of incidence at which the beam reflected from the deflection reflecting surface is incident on the system is made proportional to the image height when the optical system forms images on the surface of the object.

The term the "scanning plane" as used herein means a plane formed by a set of scanning beams in time series, i.e., a plane containing the main scan line on the object to be scanned and the optical axis of the tilt correcting scanning optical system.

However, to fully assure the beam of a constant scanning speed in the scanning plane, the problems of chromatic aberration, etc. need to be considered.

For example, with apparatus for forming color images on a silver salt film with three laser beams having wavelengths corresponding to red, green and blue colors, it is difficult to assure all the laser beams of a constant scanning speed on the surface to be scanned owing to chromatic aberration.

There are two kinds of chromatic aberrations, i.e., axial chromatic aberration and lateral chromatic aberration. Axial aberration means a difference in image forming position in the axial direction due to the difference in wavelength between laser beams.

In the event of lateral aberration, laser beams of different wavelengths form images at positions which differ in a direction orthogonal to the optical axis within the scanning plane, hence deviation of the beams in the scanning direction. The deviation of beams leads to an error in superimposing the spots of different colors and therefore exerts an adverse effect especially on images.

Alternatively in apparatus for recording images with a single laser beam, variations in temperature, for example, alter the wavelength of the laser beam, consequently making it impossible for the beam to scan the object at a fully constant speed. As a result, images of impaired quality will then be formed, for example, because spots will not be accurately positioned at image ends.

SUMMARY OF THE INVENTION

The present invention has been accomplished in view of the foregoing situation.

The main object of the present invention is to provide a scanning optical system free of the above drawbacks.

Another object of the present invention is to provide a scanning optical system free from chromatic aberrations, i.e., a scanning optical system which is adapted to scan the contemplated surface always at a constant speed despite a difference in wavelength between the laser beams used or variations in the wavelength of the beam.

Still another object of the invention is to provide a scanning optical system having a compact construction.

These and other objects are attained by a scanning optical system comprising:
  a linear image forming optical system for converging a beam from a light source into linear images on the deflection reflecting surface of deflecting means, and
  a scanning image forming optical system for causing the beam reflected from the deflecting means to form images on the object to be scanned, the scanning image forming optical system including:
    at least one toric surface, and
    at least one compound lens composed of a positive lens and a negative lens.

In accordance with another aspect of the present invention, there is provided a scanning optical system comprising:
  a laser light source,
  a first image forming optical system for forming linear images with a laser beam emitted by the laser light source,
  deflecting means having a deflection reflecting surface in the vicinity of the linear image formed by the first image forming optical system, and
  a second image forming optical system for causing the laser beam deflected by the deflecting means to form images on the surface to be scanned, the second image forming optical system forming a conjugate relation between the linear image in the vicinity of the deflection reflecting surface and a point on the surface to be scanned within a plane perpendicular to the scanning plane of the laser beam and containing the optical axis of the second image forming optical system, the second image forming optical system including:
    at least one toric surface, and at least one compound lens composed of a positive lens and a negative lens.

BRIEF DESCRIPTION OF THE DRAWINGS

These and other objects or features of the present invention will become apparent from the following description of preferred embodiments thereof taken in conjunction with the accompanying drawings, in which:

FIG. 1 shows the construction of a lens system as a first embodiment of the invention, FIG. 1 (A) being a diagram in section taken along a scanning plane and showing the lens system, and FIG. 1 (B) being a diagram of the lens system in section taken along a plane containing the optical axis and perpendicular to the scanning plane;

FIG. 2 shows the construction of a lens system as a second embodiment of the invention, FIG. 2 (A) being a diagram in section taken along a scanning plane and showing the lens system, and FIG. 2 (B) being a diagram of the lens system in section taken along a plane containing the optical axis and perpendicular to the scanning plane;

In the following description, like parts are designated by like reference numbers throughout the several drawings.

DESCRIPTION OF THE PREFERRED EMBODIMENTS

Specific embodiments of the present invention will be described below with reference to the drawings.

The scanning optical system of the present invention is used, for example, in laser beam printers and the like.

Figure 10:
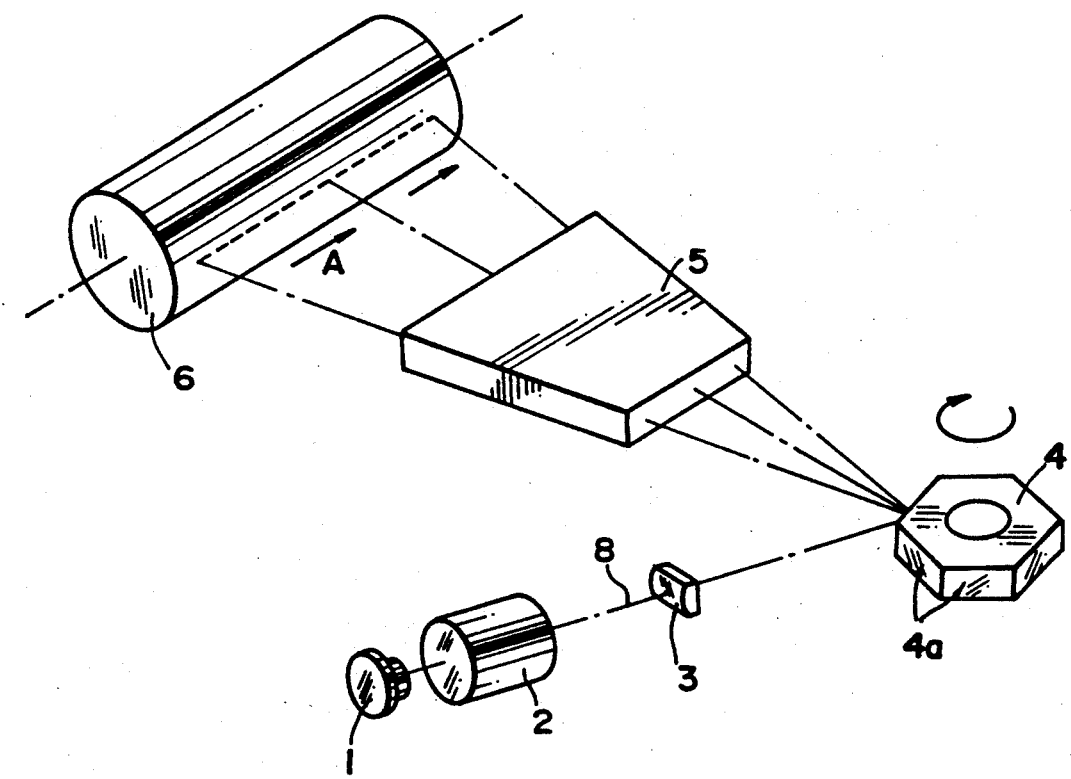
FIG. 10 is a perspective view schematically showing a laser printer having incorporated therein the scanning optical system of the invention.

FIG. 10 shows a laser beam printer which comprises a semiconductor laser 1 serving as a light source, collimator lens 2, cylindrical lens 3, polygonal mirror 4, fθ lens 5, photosensitive drum 6, etc.

The semiconductor laser 1 emits a laser beam 8 as directly modulated in accordance with image data. The rays of the laser beam 8, which is an example of beam, are rendered parallel by the collimator lens 2. The beam is then converged to a linear form first by the cylindrical lens 3 which is an example of linear image forming optical system, forming images on a deflection reflecting surface 4a of the polygonal mirror 4 which is an example of deflecting means. Upon reflection at the surface 4a, the laser beam 8 is deflected with the rotation of the polygonal mirror 4 and caused to form images on the photosensitive drum 6 by the fθ lens 5 which is an example of scanning image forming optical system, and thus scans the drum in the direction of arrow A shown.

The tilt of the deflection reflecting surfaces 4a of the deflecting means 4 is corrected by the linear image forming optical system 3 and the scanning image forming optical system 5 to eliminate the variation in the pitch of scan lines to be produced by the tilt.

Figure 11:
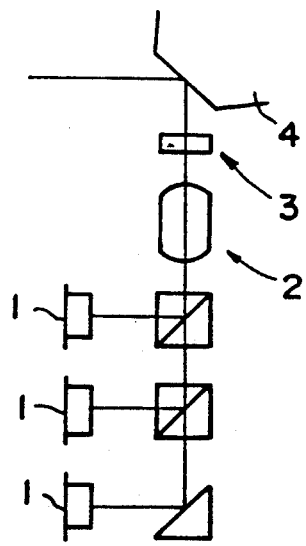
FIGS. 11, 12 and 13 are diagrams showing different arrangements of beam combining means for use with a plurality of laser beams.
Figure 12:
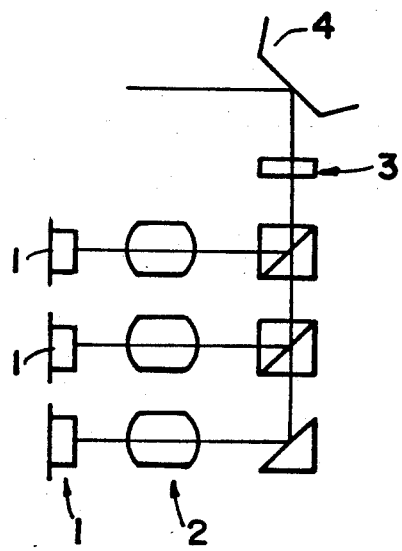
Figure 13:
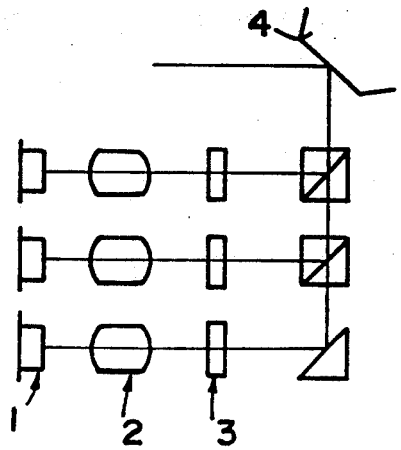

When a plurality of laser beams are used as already described, the arrangements shown in FIGS. 11, 12 and 13 are useful. FIG. 11 shows beam combining means (such as prisms or mirrors) arranged between semiconductor lasers 1 and a collimator lens 2. FIG. 12 shows beam combining means arranged between collimator lenses 2 and a cylindrical lens 3. In the arrangement of FIG. 13, beam combining means are disposed between cylindrical lenses 3 and deflecting means 4.

When the beam combining means are interposed between the semiconductor lasers 1 and the collimator lens 2, the collimator lens 2 and the cylindrical lens 3 are used in common for the beams, while if the beam combining means are provided between the collimator lenses 2 and the cylindrical lens 3, the cylindrical lens 3 is used in common.

Given below are the specifications of specific embodiments of the scanning image forming optical system 5.

Figure 3:
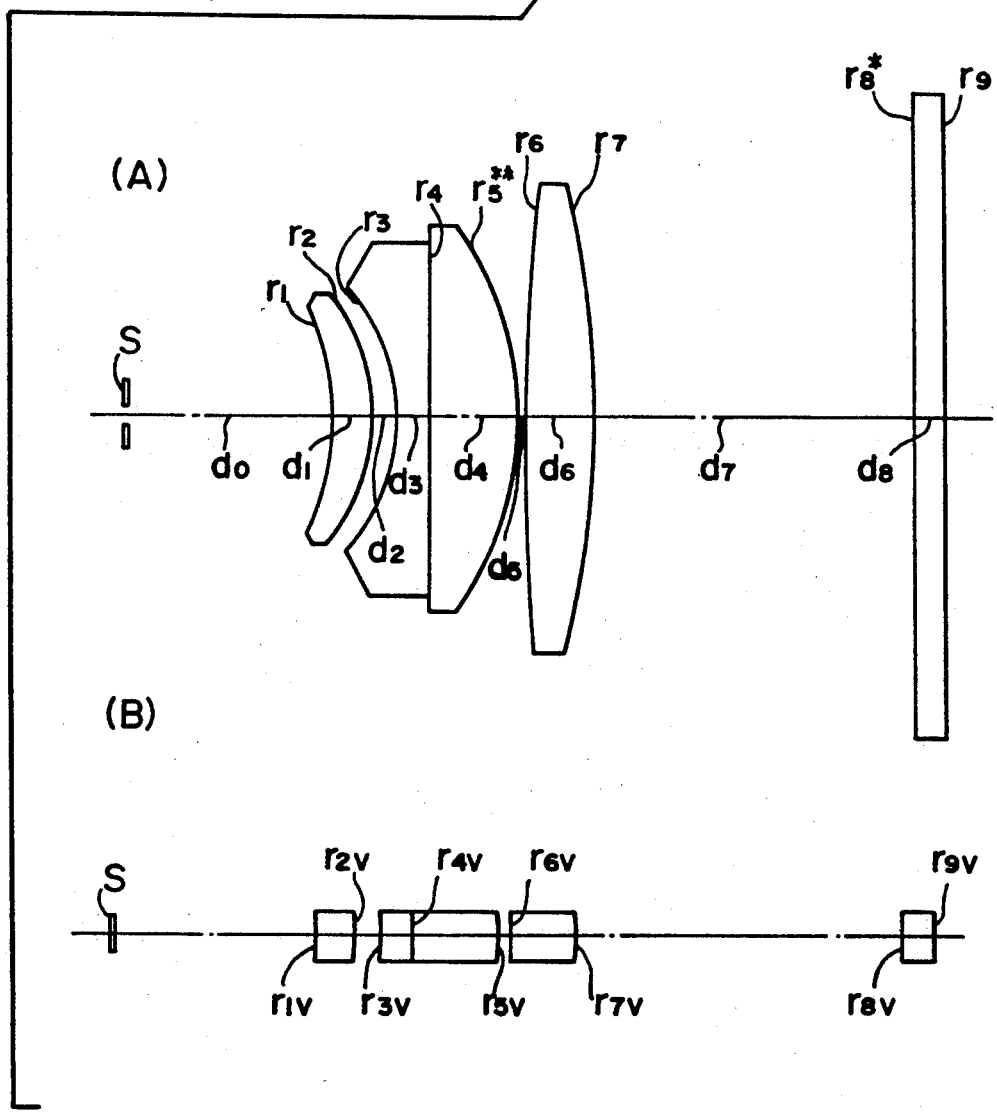
FIG. 3 shows the construction of a lens system as a third embodiment of the invention, FIG. 3 (A) being a diagram in section taken along a scanning plane and showing the lens system, and FIG. 3 (B) being a diagram of the lens system in section taken along a plane containing the optical axis and perpendicular to the scanning plane.

Three embodiments are given. FIGS. 1 to 3 are diagrams showing the construction of lens systems of these embodiments, and FIGS. 4 to 9 are aberration diagrams thereof. Table 1 collectively shows the corresponding relationship between the embodiments and the drawings.

TABLE 1

Figure 4:
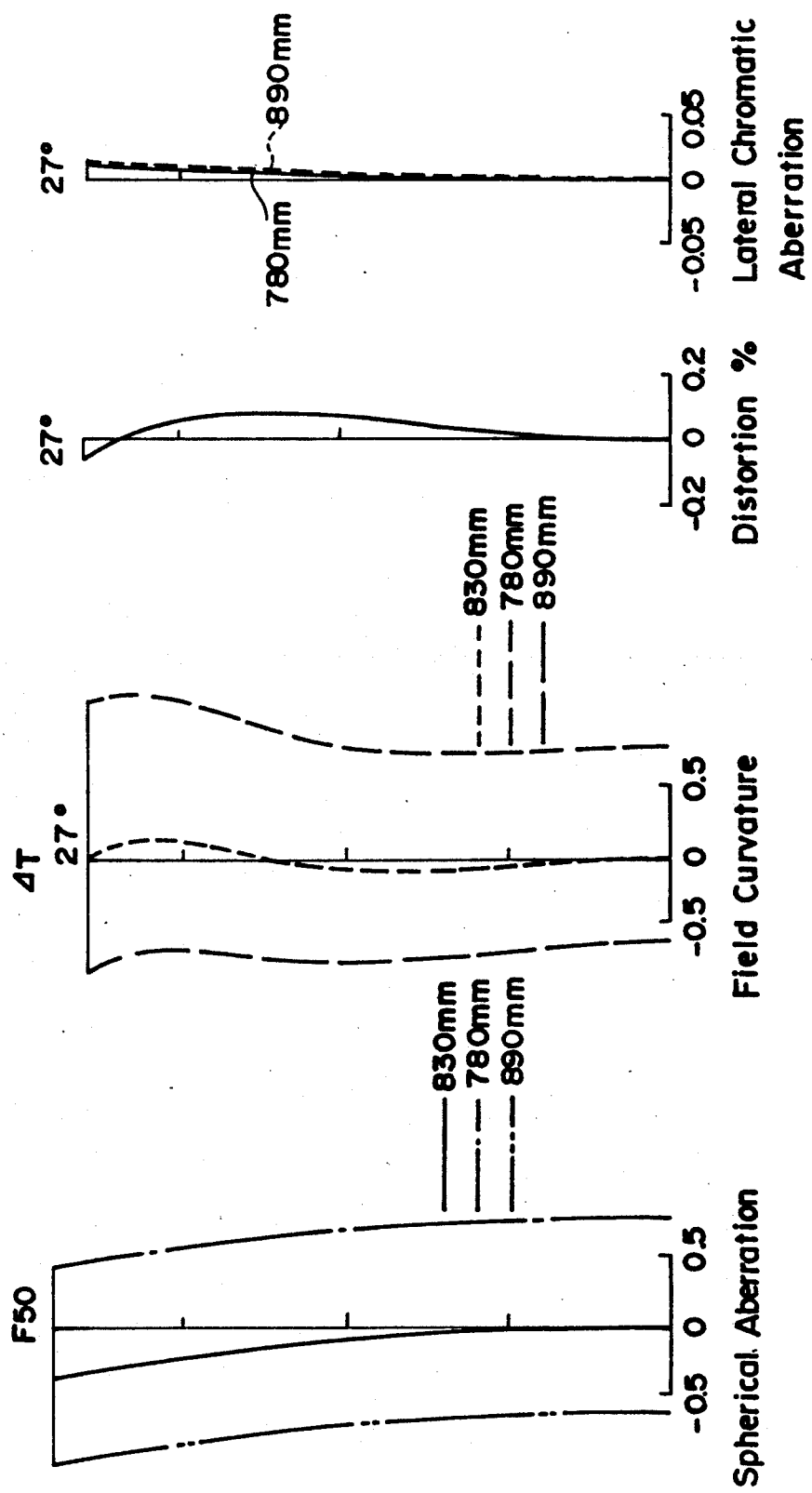
FIGS. 4, 5 and 6 are aberration curve diagrams of the first, second and third embodiments, respectively, in a direction along the scanning plane.
Figure 5:
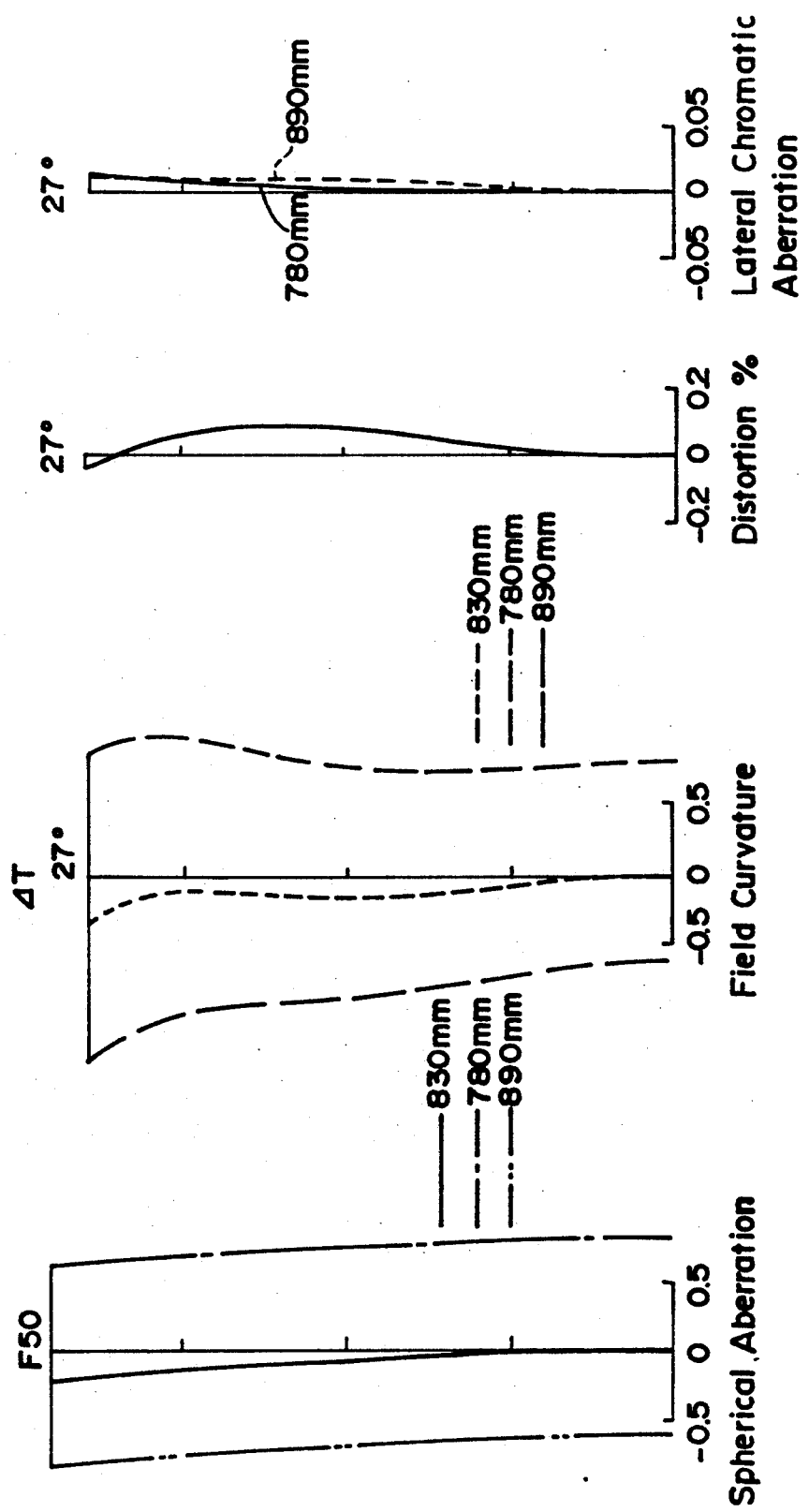
Figure 6:
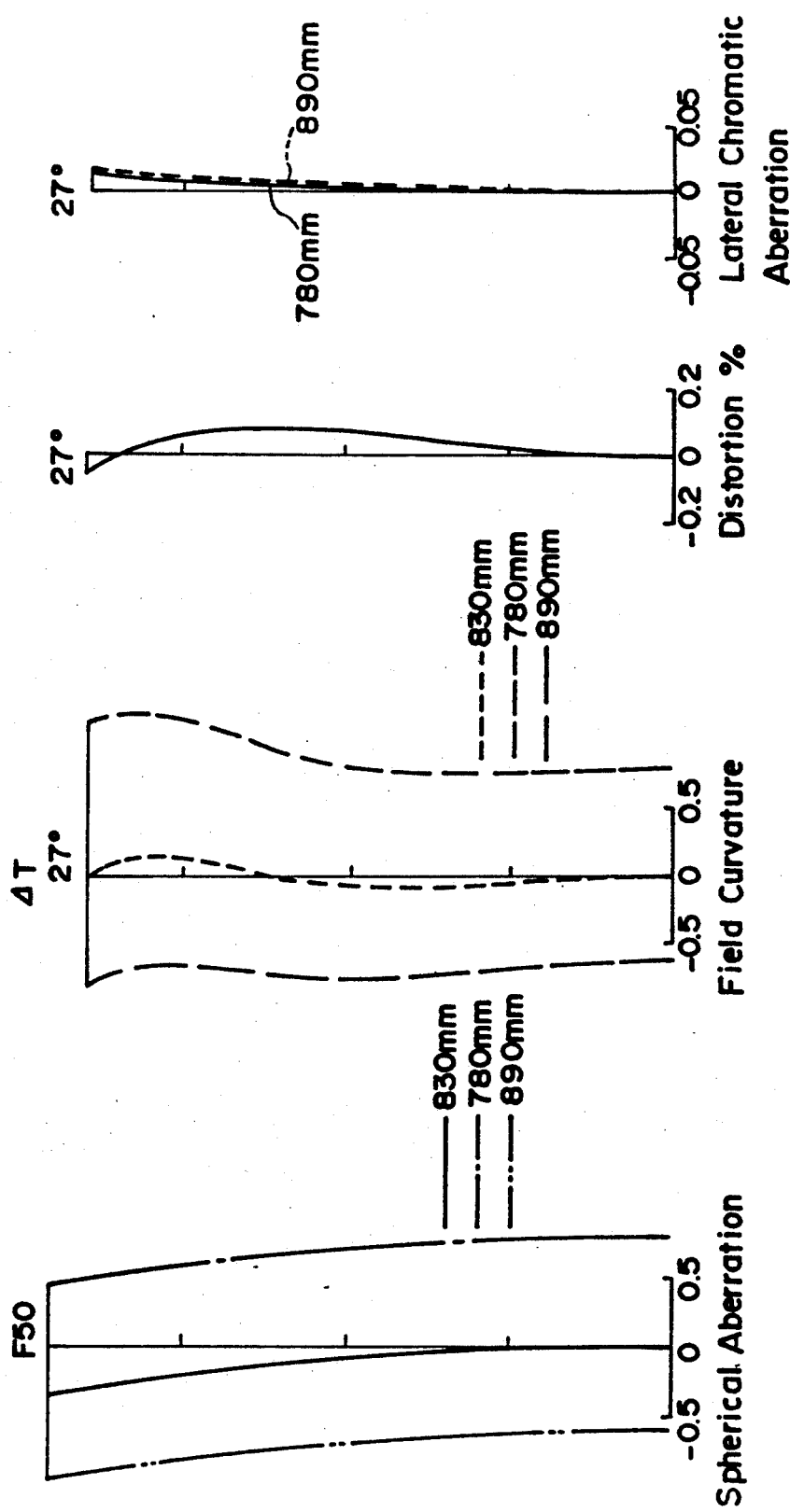
Figure 7:
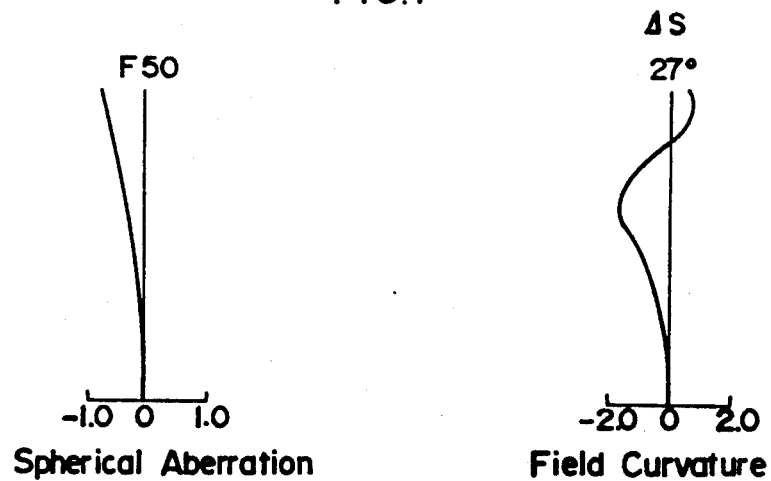
FIGS. 7, 8 and 9 are aberration curve diagrams of the first, second and third embodiments, respectively, in a direction orthogonal to the scanning plane.
Figure 8:
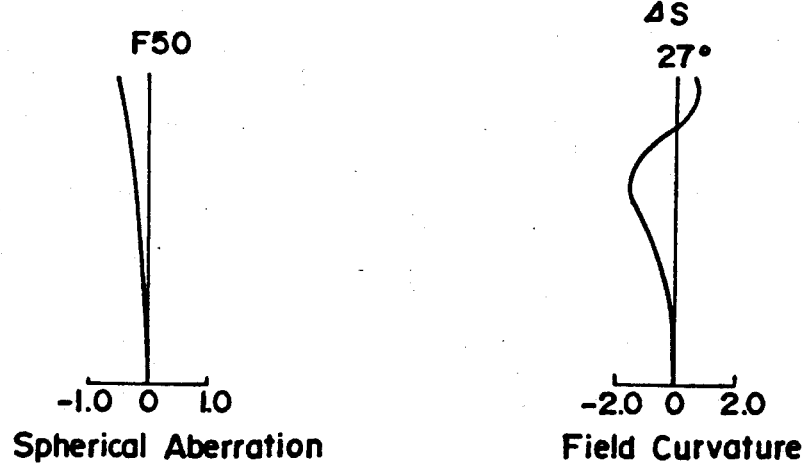
Figure 9:
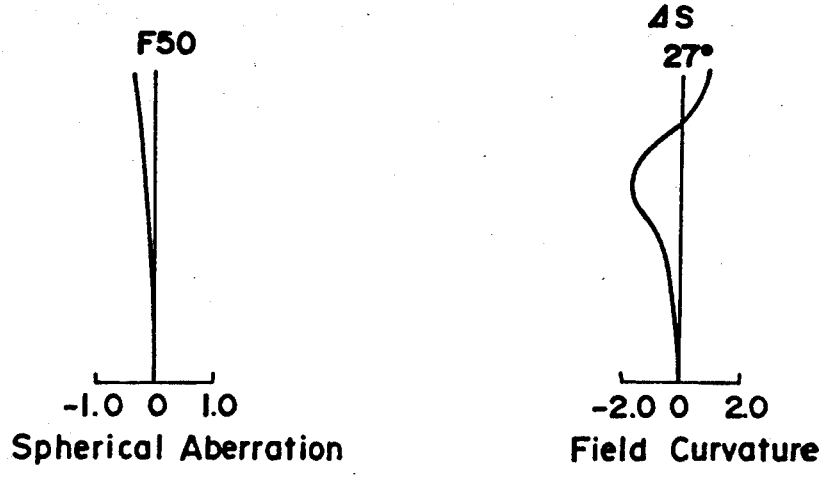

| Embodiment | Lens construction diagram | Aberration diagram along scanning plane | Aberration diagram perpendicular to scanning plane |
|---|---|---|---|
| 1 | FIG. 1 (A), (B) | FIG. 4 | FIG. 7 |
| 2 | FIG. 2 (A), (B) | FIG. 5 | FIG. 8 |
| 3 | FIG. 3 (A), (B) | FIG. 6 | FIG. 9 |

The lens construction diagram (A) shows the arrangement of component lenses in section taken along the scanning plane, and the lens construction diagram (B) shows the arrangement of component lenses in section taken along a plane orthogonal to the scanning plane.

In the aberration diagram in a direction along the scanning plane, the distortion is expressed in terms of the difference, in percentage, of the actual image height from an ideal image height for assuring the beam of a constant scanning speed, as represented by the expression:

$$\{(y' - f\theta)/f\theta\} \times 100(\%)$$

wherein
- $\theta$: incident angle (angle the deflected beam makes with the lens optical axis)
- $f$: focal length of the overall scanning image forming optical system in the direction along the scanning plane
- $f\theta$: ideal image height
- $y'$: actual image height The specifications of the embodiments include the following numerical values.
- $2\omega$: Maximum incident angle n1 ν1: Refractive index (at 830 nm) and Abbe number of optical material for a first lens L1
n2, ν2: Refractive index (at 830 nm) and Abbe number of optical material for a second lens L2
n3, ν3: Refractive index (at 830 nm) and Abbe number of optical material for a third lens L3
n4, ν4: Refractive index (at 830 nm) and Abbe number of optical material for a fourth lens L4
n5, ν5: Refractive index (at 830 nm) and Abbe number of optical material for a fifth lens L5
r1–r9: Radius of curvature of the surface
r1V–r9V: Radius of curvature in the direction orthogonal to the scanning plane
d0–d8: Axial distance
f1H: Focal length of the first lens in the direction along the scanning plane
f1V: Focal length of the first lens in the direction orthogonal to the scanning plane
f3H: Focal length of the third lens in the direction along the scanning plane
f3V: Focal length of the third lens in the direction orthogonal to the scanning plane The superscript mark "*" affixed to the symbol for a surface indicates a cylindrical surface, and the mark "**" a toric surface.

TABLE 2

(Embodiment 1)

$f = 380$, FNO. $= 50$, $2\omega = 54°$, $f1H/f1V = 2.98$, $\nu2/\nu3 = 0.58$

| | | Radius of curvature | | Radius of curvature in subscanning direction | | Axial distance | | Refractive index (Nd) (830 nm) | | Abbe number (νd) |
|---|---|---|---|---|---|---|---|---|---|---|
| S | | — | | | d0 | 66.0 | | | | |
| L1 | r1 | −75.178 | r1V | −75.178 | d1 | 12.0 | N1 | 1.70889 | ν1 | 50.3 |
| | r2** | −56.977 | r2V | −36.220 | d2 | 8.0 | | | | |
| L2 | r3 | −55.957 | r3V | −55.957 | d3 | 10.6 | N2 | 1.69975 | ν2 | 29.4 |
| | r4 | −3594.536 | r4V | −3594.536 | d4 | 27.0 | N3 | 1.70889 | ν3 | 50.3 |
| L3 | r5 | −98.059 | r5V | −98.059 | d5 | 4.0 | | | | |
| L4 | r6 | 852.849 | r6V | 852.849 | d6 | 20.0 | N4 | 1.51020 | ν4 | 64.1 |
| | r7 | −303.168 | r7V | −303.168 | d7 | 105.0 | | | | |
| L5 | r8 | ∞ | r8V | ∞ | d8 | 10.0 | N5 | 1.51020 | ν5 | 64.1 |
| | r9* | ∞ | r9V | −138.401 | | | | | | |

TABLE 3

(Embodiment 2)

$f = 380$, FNO. $= 50$, $2\omega = 54°$, $f1H/f1V = 3.06$, $\nu2/\nu3 = 0.58$

| | | Radius of curvature | | Radius of curvature in subscanning direction | | Axial distance | | Refractive index (Nd) (830 nm) | | Abbe number (νd) |
|---|---|---|---|---|---|---|---|---|---|---|
| S | | — | | | d0 | 67.0 | | | | |
| L1 | r1 | −76.030 | r1V | −76.030 | d1 | 12.0 | N1 | 1.70889 | ν1 | 50.3 |
| | r2** | −58.673 | r2V | −37.391 | d2 | 7.0 | | | | |
| L2 | r3 | −56.589 | r3V | −56.589 | d3 | 9.9 | N2 | 1.69975 | ν2 | 29.4 |
| | r4 | ∞ | r4V | ∞ | d4 | 28.0 | N3 | 1.70889 | ν3 | 50.3 |
| L3 | r5 | −96.400 | r5V | −96.400 | d5 | 4.0 | | | | |
| L4 | r6 | 852.516 | r6V | 858.516 | d6 | 20.0 | N4 | 1.51020 | ν4 | 64.1 |
| | r7 | −310.923 | r7V | −310.923 | d7 | 105.0 | | | | |
| L5 | r8* | ∞ | r8V | 140.233 | d8 | 10.0 | N5 | 1.51020 | ν5 | 64.1 |
| | r9 | ∞ | r9V | ∞ | | | | | | |

TABLE 4

(Embodiment 3)

f = 380, FNO. = 50, 2ω = 54°, f3H/f3V = 1.59, ν2/ν3 = 0.58

| | | Radius of curvature | | Radius of curvature in subscanning direction | | Axial distance | | Refractive index (Nd) (830 nm) | | Abbe number (νd) |
|---|---|---|---|---|---|---|---|---|---|---|
| | S | — | | | d0 | 66.0 | | | | |
| L1 | r1 | −75.178 | r1V | −75.178 | | | | | | |
| | | | | | d1 | 12.0 | N1 | 1.70889 | ν1 | 50.3 |
| | r2 | −56.977 | r2V | −56.977 | | | | | | |
| | | | | | d2 | 8.0 | | | | |
| L2 | r3 | −55.957 | r3V | −55.957 | | | | | | |
| | | | | | d3 | 10.6 | N2 | 1.69975 | ν2 | 29.4 |
| | r4 | −3594.536 | r4V | −3594.536 | | | | | | |
| L3 | | | | | d4 | 27.0 | N3 | 1.70889 | ν3 | 50.3 |
| | r5** | −98.059 | r5V | −62.394 | | | | | | |
| | | | | | d5 | 4.0 | | | | |
| L4 | r6 | 852.849 | r6V | 852.849 | | | | | | |
| | | | | | d6 | 20.0 | N4 | 1.51020 | ν4 | 64.1 |
| | r7 | −303.168 | r7V | −303.168 | | | | | | |
| | | | | | d7 | 105.0 | | | | |
| L5 | r8* | ∞ | r8V | 163.375 | | | | | | |
| | | | | | d8 | 10.0 | N5 | 1.51020 | ν5 | 64.1 |
| | r9 | ∞ | r9V | ∞ | | | | | | |

As will be apparent from the above embodiments, at least one toric surface is incorporated into the scanning image forming optical system 5 according to the invention. The presence of the toric surface gives a compact construction to the optical system 5 which forms a conjugate relation between the reflecting surface of the deflecting means 5 and the surface of the object (photosensitive drum 6) to be scanned.

Additionally, the scanning image forming optical system 5 has incorporated therein a compound lens comprising a positive lens and a negative lens, whereby one of the object of the invention can be fully attained, that is, chromatic aberration can be satisfactorily corrected.

It is further desirable that the optical system of the present invention fulfill the requirement represented by the following expression (1) to correct chromatic aberration.

$$0.4 < \nu N/\nu p < 0.7 \quad (1)$$

wherein

νN: Abbe number of the negative lens included in the compound lens

νP: Abbe number of the positive lens included in the compound lens

The expression (1) defines the dispersion ratio of the negative lens to the positive lens joined thereto. When the dispersion ratio is smaller than 0.7, the component lenses sufficiently differ in dispersing properties, so that even if the refracting power of the negative lens is relatively small, chromatic aberration can be corrected. The resulting refracting power of the compound lens is negative and permits great negative chromatic aberration, which offsets the chromatic aberration due to the positive refracting power of the other components lenses to correct the chromatic aberration of the entire lens system. When νN/νP is smaller then 0.4, chromatic aberration can be corrected if the refracting power of the negative lens is small, whereas increased positive distortion will then result, making it difficult to realize constant speed scanning.

The expression (2) given below represents a preferred requirement which is to be fulfilled for the optical system of the invention to exhibit satisfactory image forming properties.

$$1 < fTH/fTV < 10 \quad (2)$$

wherein fTH: focal length of the lens having a toric surface in the direction along the sanning plane fTV: focal length of the lens having a toric surface in the direction orthogonal to the scanning plane The expression (2) is chiefly relevant to the field curvature and tilt correcting effect in the direction orthogonal to the scanning plane. If the focal length ratio is smaller than the lower limit of the expression (2), negative curvature of field occurs, whereas if the upper limit is exceeded, marked positive curvature of field occurs where the field angle is great, with a reduced tilt correcting effect. In either case, it becomes difficult to correct field curvature over a wide angle of field. In the case where field curvature still remains to be corrected fully, spots will have varying diameters on scan lines to produce degraded images.

Especially when the positive first lens L1, the compound lens composed of the negative second lens L2 and the positive third lens L3, and the positive fourth lens L4 are arranged in the direction along the scanning plane, the optical system has satisfactory image forming characteristics while retaining such distortion characteristics that the beam is fully capable of scanning the object at a constant speed in this direction.

When the first lens L1 or the third lens L3 is provided with a toric surface, an optical system is available which is compact in its entirety and exhibits satisfactory characteristics in the direction orthogonal to the scanning plane. Preferably, this system fulfills the following requirement.

(I) When the first lens L1 has a toric surface:

$$2 < f1H/f1V < 5 \quad (3)$$

wherein f1H: focal length of the first lens L1 in the direction along the scanning plane f1V: focal length of the first lens L1 in the direction orthogonal to the scanning plane (II) When the third lens L3 has a toric surface:

$$1 < F3H/f3V > e \quad (4)$$

wherein f3H: focal length of the third lens L3 in the direction along the scanning plane f3V: focal length of the third lens L3 in the direction orthogonal to the scanning plane The expression (3) or (4) in the case (I) or (II) is chiefly relevant to the field curvature and tilt correcting effect in the direction orthogonal to the scanning plane. If the focal length ratio is smaller than the lower limit of the expression (3) or (4), negative curvature of field occurs, whereas if the upper limit is exceeded, marked positive curvature of field occurs where the field angle is great, with a reduced tilt correcting effect. In either case, it becomes difficult to correct field curvature over a wide angle of field. In the case where field curvature still remains to be fully corrected, spots will have varying diameters on scan lines to produce degraded images.

Further when the cylindrical surface of the fifth lens L5 is given a positive refracting power in the direction orthogonal to the scanning plane, this surface cooperates with the toric surface of the first lens L1 or the third lens L3, enabling the optical system to exhibit satisfactory image forming characteristics in the direction orthogonal to the scanning plane over a wide angle of field.

As described above, the scanning optical system of the present invention has at least one toric surface, includes at least one compound lens composed of a positive lens and a negative lens and forms a conjugate relation between the deflection reflecting point on the deflecting means and the image forming point on the object to be scanned, in the direction orthogonal to the scanning plane while retaining satisfactory image forming characteristics in this direction.

Further in the direction along the scanning plane, the optical system has distortion characteristics permitting the beam to scan the object at a fully constant speed and nevertheless retains excellent image forming characteristics with chromatic aberration satisfactorily corrected.

What is claimed is:

1. A light beam scanning optical system comprising:
   a laser light source;
   a first image forming optical system for forming linear images with a laser beam emitted by the laser light source;
   deflecting means having a reflecting surface in the vicinity of the linear image formed by the first image forming optical system; and
   a second image forming optical system for causing the laser beam deflected by the deflecting means to form images on a surface to be scanned, the second image forming optical system forming a conjugate relation between the linear image in the vicinity of the reflecting surface and a point on the surface to be scanned within a plane perpendicular to the scanning plane of the laser beam and containing the optical system, the second image forming optical system including at least one toric surface and at least one compound lens unit composed of a positive lens and a negative lens, and further satisfying the following conditional expressions:

$$1 < fTH/fTV < 10$$

wherein fTH is focal length of the lens unit having a toric surface in the direction along the scanning plane and fTV is focal length of the lens unit having a toric surface in the direction orthogonal to the scanning plane.

2. A light beam scanning optical system as claimed in claim 1, wherein said light source emits a plurality of beams each of which has a different wavelength from each other.

3. A light beam scanning optical system as claimed in claim 1, further satisfying the following conditional expressions:

$$0.4 < \nu N/\nu P < 0.7$$

wherein $\nu N$ is Abbe number of the negative lens included in said compound lens unit and $\nu P$ is Abbe number of the positive lens included in said compound lens unit.

4. A light beam scanning optical system comprising:
   a linear image forming optical system for converging a beam from a light source into linear image on the deflection reflecting surface of deflecting means; and
   a scanning image forming optical system for causing the beam reflected from said deflecting means to form images on the object to be scanned, said scanning image forming optical system including, in order from said deflecting means side, a first lens having a toric surface, a compound lens unit composed of a negative lens and a positive lens, a second lens of positive power and a third lens having a cylindrical surface.

5. A light beam scanning optical system as claimed in claim 4, further satisfying the following conditional expressions:

$$2 < f1H/f1V < 5$$

wherein f1H is a focal length of said first lens in direction along the scanning plane and f1V is a focal length of said first lens in direction orthogonal to the scanning plane.

6. A light beam scanning optical system as claimed in claim 4, wherein said third lens has a positive refracting power in the direction orthogonal to the scanning plane.

7. A light beam scanning optical system comprising:
   a linear image forming optical system for converging a beam from a light source into linear image on a reflecting surface of deflecting means; and
   a scanning image forming optical system for causing the beam reflected from said deflecting means to form images on the object to be scanned, said scanning image forming optical system including at least one compound lens unit composed of a negative lens and a positive lens wherein at least one surface of the lens included in the compound lens unit is a toric surface.

8. A light beam scanning optical system comprising:
   a linear image forming optical system for converging a beam from a light source into linear image on a reflecting surface of deflecting means; and
   a scanning image forming optical system for causing the beam reflected from said deflecting means to form images on the object to be scanned, said scanning image forming optical system including, in order from said deflecting means side, a first lens of positive power, a compound lens unit composed of a negative lens and a positive lens having a toric surface, a second lens of positive power and a third lens having a cylindrical surface.

9. A light beam scanning optical system as claimed in claim 8, further satisfying the following conditional expressions:

$$1 < f3H/f3V < 3$$

wherein f3H is a focal length of said positive lens of said compound lens unit in the direction along the scanning plane and f3V is a focal length of said positive lens in the direction orthogonal to the scanning plane.

10. A light beam scanning optical system comprising:
a plurality of light source emitting laser beams respectively;
beam combining means for combining said plurality of beams to form one beam;
a linear image forming optical system for converging said combined beam into linear images on the deflection reflecting surface of deflecting means; and
a scanning image forming optical system for causing the beam reflected from the deflecting means to form images on the object to be scanned, the scanning image forming optical system including, a lens unit having at least one toric surface and at least one compound lens unit composed of a positive lens and a negative lens.

11. A light beam scanning optical system comprising:
a plurality of light source emitting laser beams respectively;
a linear image forming optical system for forming linear images with said plurality of laser beams respectively;
beam combining means for combining said plurality of linear images to form one linear images; and
a scanning image forming optical system for causing the beam reflected from deflecting means to form images on the object to be scanned, the scanning image forming optical system including, at least one toric surface and at least one compound lens unit composed of a positive lens and a negative lens.

* * * * *